United States Patent
Gwilliams

(10) Patent No.: US 11,463,881 B2
(45) Date of Patent: Oct. 4, 2022

(54) VEHICULAR INTEGRATION OF ENTERPRISE WIRELESS SCANNING

(71) Applicant: Saudi Arabian Oil Company, Dhahran (SA)

(72) Inventor: John Gwilliams, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 300 days.

(21) Appl. No.: 16/773,629

(22) Filed: Jan. 27, 2020

(65) Prior Publication Data
US 2021/0235272 A1    Jul. 29, 2021

(51) Int. Cl.
| | |
|---|---|
| H04L 29/06 | (2006.01) |
| H04W 12/122 | (2021.01) |
| H04W 12/63 | (2021.01) |
| H04W 64/00 | (2009.01) |

(52) U.S. Cl.
CPC ......... *H04W 12/122* (2021.01); *H04W 12/63* (2021.01); *H04W 64/003* (2013.01)

(58) Field of Classification Search
None
See application file for complete search history.

(56) References Cited

U.S. PATENT DOCUMENTS

| | | | | |
|---|---|---|---|---|
| 8,140,094 B2* | 3/2012 | Morgan | ............... | H04W 4/02 |
| | | | | 455/456.6 |
| 8,244,240 B2* | 8/2012 | Achlioptas | ............ | H04W 24/02 |
| | | | | 455/433 |
| 8,538,457 B2* | 9/2013 | Morgan | ............... | H04W 4/20 |
| | | | | 455/515 |
| 8,571,578 B1 | 10/2013 | Chen et al. | | |
| 9,037,162 B2* | 5/2015 | Morgan | ............... | H04W 4/029 |
| | | | | 340/572.1 |
| 9,398,558 B2* | 7/2016 | Morgan | ............... | H04W 4/029 |
| 10,080,208 B2* | 9/2018 | Morgan | ............... | H04W 64/00 |

(Continued)

FOREIGN PATENT DOCUMENTS

| | | | | |
|---|---|---|---|---|
| CN | 102905256 | | 10/2014 | |
| CN | 102843690 | | 12/2014 | |
| WO | WO-2013108043 A2 * | | 7/2013 | ........... G01S 5/0242 |

OTHER PUBLICATIONS

Craig Wright, "Chapter 12—Auditing and Security with Wireless Technologies", The IT Regulatory and Standards Compliance Handbook, 2008, Elsevier Inc., p. 299-325, 27 pages. (Year: 2008).*

(Continued)

*Primary Examiner* — Jeffery L Williams
(74) *Attorney, Agent, or Firm* — Fish & Richardson P.C.

(57) ABSTRACT

Systems and methods include a method for detecting and identifying access points. Signals transmitted by access points in one or more mobile telecommunications networks within range of a mobile wireless scanning system are received by the mobile wireless scanning system. A presence of the access points is detected by the mobile wireless scanning system. Locations of the access points are determined by the mobile wireless scanning system using the signals transmitted by the access points. The locations of the access points are logged by the mobile wireless scanning system. Location and identifying information for the access points are provided by the mobile wireless scanning system to a receiving client.

18 Claims, 3 Drawing Sheets

(56) References Cited

U.S. PATENT DOCUMENTS

| | | | | |
|---|---|---|---|---|
| 10,827,371 B2* | 11/2020 | Chow | | H04L 43/0876 |
| 2007/0286143 A1* | 12/2007 | Olson | | H04W 12/12 |
| | | | | 370/338 |
| 2008/0002651 A1 | 1/2008 | Nakano | | |
| 2008/0004037 A1* | 1/2008 | Achlioptas | | G01S 5/0236 |
| | | | | 455/456.1 |
| 2014/0087693 A1* | 3/2014 | Walby | | H04W 48/16 |
| | | | | 455/411 |
| 2015/0350228 A1* | 12/2015 | Baxley | | H04W 12/08 |
| | | | | 726/23 |
| 2015/0350914 A1* | 12/2015 | Baxley | | H04L 63/02 |
| | | | | 726/11 |
| 2017/0127376 A1 | 5/2017 | Jones et al. | | |
| 2018/0070239 A1* | 3/2018 | Norrman | | H04W 12/12 |
| 2018/0132058 A1* | 5/2018 | Bransfield | | G06Q 30/0261 |
| 2018/0295519 A1 | 10/2018 | Nandha Premnath et al. | | |
| 2018/0350227 A1 | 12/2018 | Komoni | | |
| 2019/0036951 A1 | 1/2019 | Kim | | |
| 2019/0268744 A1* | 8/2019 | Bransfield | | G06F 8/33 |
| 2019/0281083 A1 | 9/2019 | Watson et al. | | |
| 2020/0162924 A1* | 5/2020 | Desai | | H04W 12/122 |
| 2021/0006993 A1* | 1/2021 | Chow | | H04L 43/0876 |
| 2021/0076237 A1* | 3/2021 | Chow | | H04W 24/08 |
| 2021/0152580 A1* | 5/2021 | Jester | | H04L 63/1425 |
| 2021/0168615 A1* | 6/2021 | Guan | | H04W 8/26 |
| 2021/0235272 A1* | 7/2021 | Gwilliams | | G01S 5/0018 |
| 2021/0344699 A1* | 11/2021 | Milchtaich | | H04W 12/08 |

OTHER PUBLICATIONS techterms.com, [online] "Wardriving," Apr. 2014, retrieved on Jan. 30, 2020, retrieved from URL: <https://techterms.com/defmition/wardriving>, 2 pages.

trustwave.com, [online] "Wardrive, Raspberry Pi Style!" Dec. 2012, retrieved on Jan. 30, 2020, retrieved from URL: <https://www.truslwave.com/en-us/resources/blogs/spiderlabs-blog/wardrive-raspberry-pi-style/>, 8 pages.

PCT International Search Report and Written Opinion in International Appln. No. PCT/US2021/015205, dated May 7, 2021, 22 pages.

* cited by examiner

VEHICULAR INTEGRATION OF ENTERPRISE WIRELESS SCANNING

BACKGROUND

The present disclosure applies to discovery of access points, specifically networking hardware devices that allow Wi-Fi enabled devices to connect to a wired network. Wireless scanning, for example, can be an element of penetration testing in an area that may include one or more access points. Conventional wireless scanning techniques can tend to be manual. As a result, conventional wireless scanning techniques can include time-consuming and resource-consuming actions used to assess where wireless networks are visible and whether the wireless networks can be exploited.

In some cases, wireless testing techniques can include a time-consuming process called "war driving" in which a tester investigates a target site or target area by walking or driving around with an active wireless sensor. War driving processes can be used, for example, as a way to identify rogue networks and misconfigured corporate networks. While war driving techniques can provide a snapshot of detected access points at a particular time, the manual efforts associated with war driving techniques can limit the frequency and effectiveness of such processes. For example, gaps in time between tests can miss access points (for example, networks) that are not active at the precise time of a given test.

An organization's ability to perform security testing on wireless components connected to the organization's information technology (IT) estate is crucial. However, the ability to perform comprehensive wireless testing of all sites within a large geographic area can incur significant resource (for example, manpower) use.

SUMMARY

The present disclosure describes techniques that can be used for discovering access points. For example, an autonomous system can be used to determine locations and types of access points, particularly access points that are rogue, insecure, or otherwise undesirable. Detection can include, for example, detecting insecure wireless fidelity (WiFi) devices and WiFi hotspots; detecting traffic on specific radio frequency (RF) frequencies; and detecting rogue cell tower deployments. Information regarding detected access points can be provided in real-time to a central repository or downloaded when the mobile vehicle carrying the system returns to base. For example, the term real-time can correspond to events, including detected access points, that occur within a specified period of time, such as within seconds, minutes, or hours.

In some implementations, a computer-implemented method can be used for detecting and identifying access points. Signals transmitted by access points in one or more mobile telecommunications networks within range of a mobile wireless scanning system are received by the mobile wireless scanning system. A presence of the access points is detected by the mobile wireless scanning system. Locations of the access points are determined by the mobile wireless scanning system using the signals transmitted by the access points. The locations of the access points are logged by the mobile wireless scanning system. Location and identifying information for the access points are provided by the mobile wireless scanning system to a receiving client.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, vehicular integration of enterprise wireless scanning can eliminate the manual overhead of testing across an entire campus, without requiring additional manpower resources. Second, vehicular integration of enterprise wireless scanning can provide the ability to extend the frequency of such testing. Third, testing of remote locations can be accomplished even when it is difficult to deploy technical personnel. Fourth, vehicular integration of enterprise wireless scanning can be scaled to include an entire geographical coverage of a given organization. Fifth, testing speed of a network area can be increased using pre-configuration of scanning and reporting (for example, of detected access points). Sixth, vehicular integration of enterprise wireless scanning can provide a more efficient and repeatable mechanism for ensuring the security of a corporate wireless estate. Seventh, the hardware of the enterprise wireless scanning system can be replicated in a reliable and cost-effective way, ensuring consistent hardware specifications to minimize deployment of alternate drivers and operating system components. Eighth, the base operating system can be replicated. Ninth, the hardware can be operated at extreme temperatures that may occur in an operational region.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
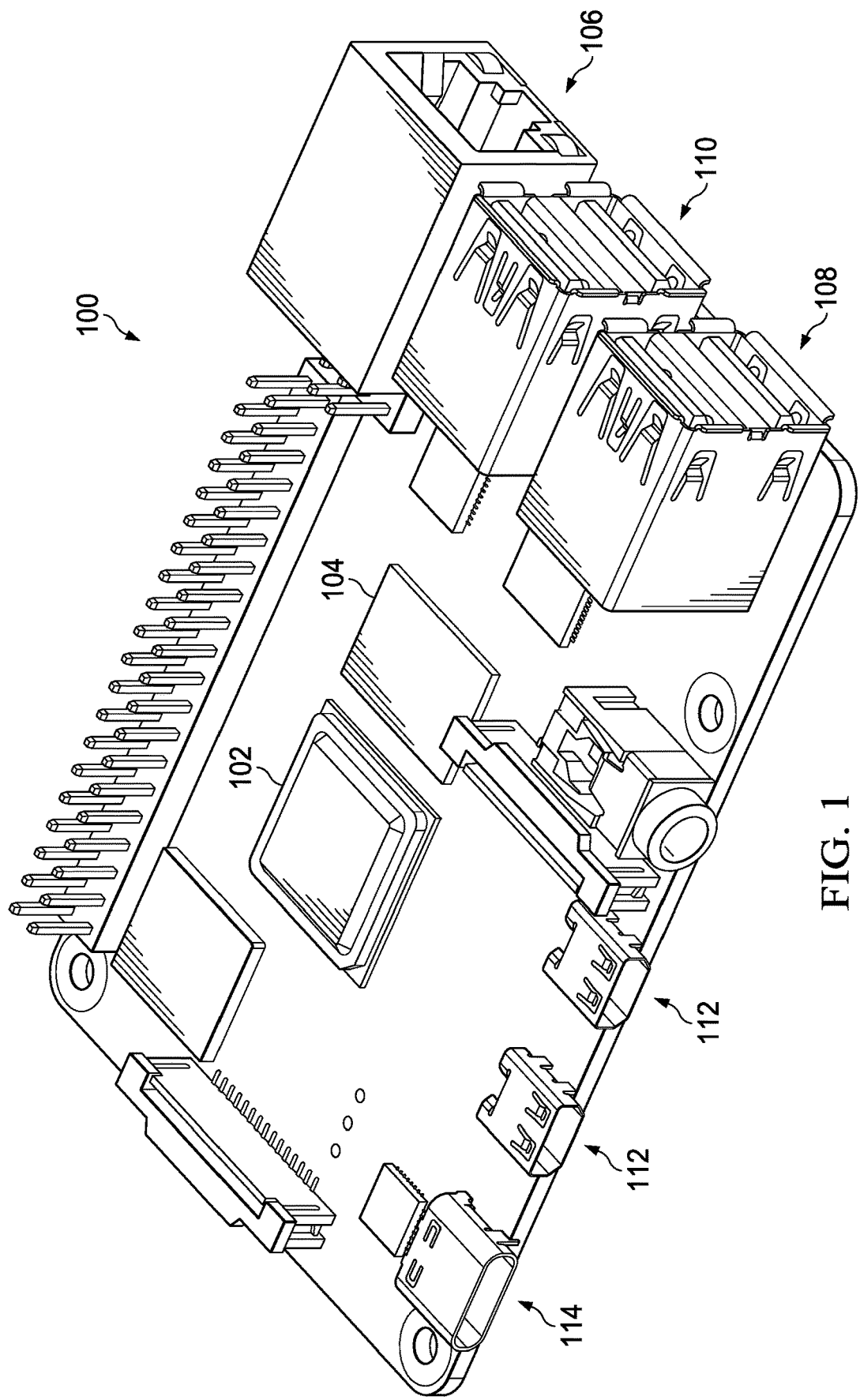
FIG. 1 is a schematic diagram of an example of a circuit board of a mini-computer used in a mobile system for discovering access points, according to some implementations of the present disclosure.

The following detailed description describes techniques for discovery of access points, specifically networking hardware devices that allow wireless fidelity (WiFi) enabled devices to connect to a wired network. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The techniques of the present disclosure can be used to implement a vehicle integrated solution that can be utilized by all security and corporate fleet vehicles to perform discovery of access points in a particular area. For example, the techniques can provide an automated, hands-free, anomalous radio frequency (RF) signal detection and analysis solution, including integrating rogue cell tower detection, access point detection, vulnerability analysis, and monitoring capabilities into an existing fleet. The techniques can be used to monitor an entire physical estate for rogue and misconfigured wireless systems.

In some implementations, the techniques can include the use of small-form, portable, components that can be integrated into security fleet vehicles to provide monitoring for all geographical regions of an estate on a regular and repeatable basis. The techniques can include automated scanning and mapping software to identify and locate all identified target RF signals, including WiFi, terrestrial trunked radio (TETRA), cell towers, and other configurable signal sources. The techniques can provide an automated upload of results to central location/solution. Components that perform the techniques can be part of a rugged build will can make the solution robust enough to be deployed at any location. Components can be integrated with corporate fleet vehicles to provide automated scanning with zero input required by the driver of each vehicle.

A vehicular integration of enterprise wireless scanning (VIEWS) system (or "device") can focus on integrating industry standard scanning tools into an enclosed unit that can be installed into security vehicles that frequently drive around large campus sites and remote sites. The device can be connected to roof-mounted, multi-directional antenna configured to persistently and continuously gather radio frequency and network data. Data that is detected can be automatically tagged with global positioning system (GPS) coordinates while the vehicle is in motion.

The device can optionally upload the data to an Internet source for real-time data acquisition. For example, the term real-time can correspond to events, including detected access points, that occur within a specified period of time, such as within seconds, minutes, or hours. The device can also optionally upload the captured data once the vehicle returns to a base (for example, the vehicle's normal parking spot).

Penetration test experts can perform manual analytics on data captured by the device to verify potential vulnerabilities, generate reports, and initiate and track remediation activities. The remediation activities can include, for example, additional manual testing of specific wireless signals, anomalous RF transmissions, rogue cell-towers, and other specifically identified areas of concern. In some implementations, the device can use open source products (for example, Raspberry Pi and HackRF One) so that the device can be integrated into a vehicle for testing and proof-of-concept.

FIG. 1 is a schematic diagram of an example of a circuit board 100 of a mini-computer used in a mobile system for discovering access points, according to some implementations of the present disclosure. In some implementations, the circuit board 100 can include (or be implemented using) a Raspberry Pi 4 Model B mini-computer that can be connected to a Quimat 3.5" touch screen display The circuit board 100 includes a processor 102, for example, a 1.5 GHz quad-core 64-bit ARM (Holdings) Cortex-A72 central processing unit (CPU). Memory 104 can be, for example, 1 gigabyte (GB), 2 GB, or 4 GB of low-power double data rate 4 (LPDDR4) of synchronous dynamic random access memory (SDRAM). Connectivity to the circuit board 100 can be provided using an Ethernet™ port 106, universal serial bus (USB) 2.0 ports 108, USB 3.0 ports 108, and micro High-Definition Multimedia Interface (HDMI) ports 112 (for example, capable of supporting dual monitors at resolutions up to 4K). Power can be provided to the circuit board 100 using, for example, a USB-C power supply. The circuit board 100 can provide full-throughput, dual-band 802.11ac wireless networking, for example. The circuit board 100 can be Bluetooth 5.0 compatible. The circuit board 100 can support VideoCore VI graphics, supporting OpenGL ES 3.x. The circuit board 100 can support 4Kp60 hardware decoding of high-efficiency video coding (HEVC) video.

The mini-computer can operate an installation of the Kali Linux operating system on a 200 GB micro-SD (secure digital) drive. The circuit board 100 can be powered, for example, using a mobile battery pack (for example, Anker 20000 mA) or using vehicle-integrated 12-volt power over a micro-USB connection.

The circuit board 100 can provide 802.11x, Ethernet™ connectivity and a software defined radio (SDR) unit (for example, HackRF One), and can optionally be configured with cellular technology using a Global System for Mobile Communications (GSM) extension board, for example, Raspberry PI SIM800 GSM/GPRS (General Packet Radio Services). In some implementations, 802.11x-compatible configurations can support 5 GigaHertz (GHz) and 2.4 GHz detections across applicable wireless channels. RF detection can be configured throughout a 7 GHz RF range.

Figure 2:
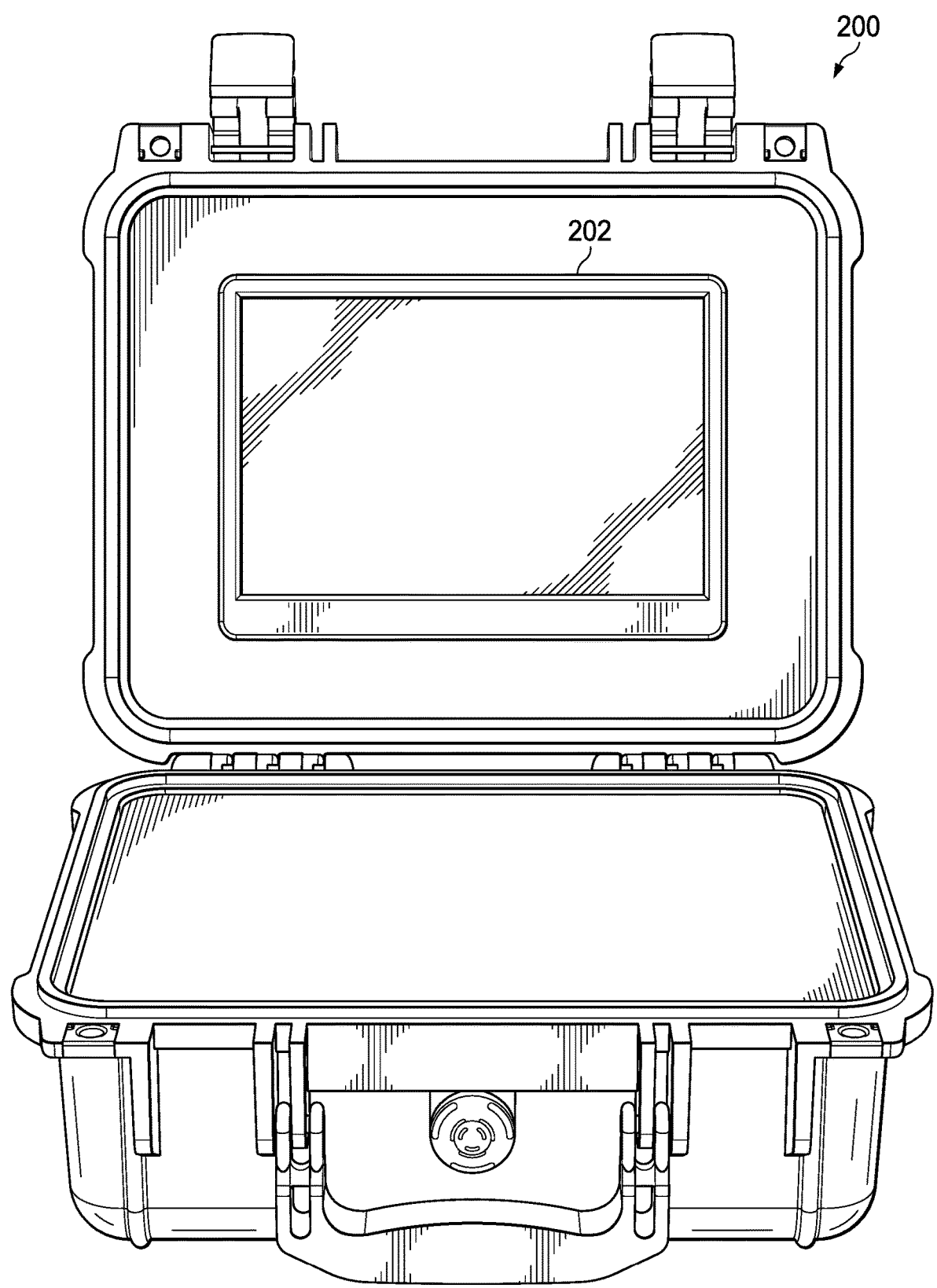
FIG. 2 is a drawing of an example of a mobile system for discovering access points, according to some implementations of the present disclosure.

FIG. 2 is a drawing of an example of a mobile system 200 for discovering access points, according to some implementations of the present disclosure. The mobile system 200 can be installed in a ruggedized case (for example, a Pelican™ mobile tool case or "Peli-case"). The mobile system 200 can contain the circuit board 100 and can include a touch screen display 202.

In some implementations, the mobile system 200 can be integrated as (or include components of) a roof-mounted, high-gain, multi-directional unit. Antennas of the mobile system 200 can maximize range for thorough wireless and RF detection.

In some implementations, the mobile system 200 can be configured to operate in multiple configurations, including 1) a WiFi war driving mode, 2) an RF scanner mode, and 3) a rogue cell tower detection mode. In some implementations, the different configurations can be set manually or set automatically based on different conditions and time-of-day.

In the WiFi war driving mode, the mobile system 200 can be integrated with on-board WiFi Scanning device, external antennas, and a GPS device that operate together to locate and record WiFi hotspots. For example, in this mode, the mobile system 200 can be used to detect insecure WiFi devices.

In the RF scanner mode, the mobile system 200 can be integrated with software-defined radio, a HackRF One device, and external RF antennas to detect and capture traffic on specific RF frequencies for off-line analytics. For example, in this mode, the mobile system 200 can be used to detect issues including insecure RF transmissions (for example, radio communication channels), illicit transmissions, and incorrectly-configured Internet of Things (IoT) devices that are leaking data on specific RF channels.

In the rogue cell tower detection mode, the mobile system 200 can be integrated with GSM component and support of optimal routing (SOR) to detect potential rogue cell tower deployments. For example, this mode can be used to detect localized attacks on mobile telecommunications networks.

The mobile system 200 can be supplemented by customized software that is designed to provide hands-free detection and logging of access points, rogue cell towers, and other anomalous RF signals. The mobile system 200 can use and be integrated with automated GPS technology to enable location mapping.

The mobile system 200 can be configured to provide one or both of a real-time update (RTU) information to a central repository and updates upon return-to-base (RTB). RTU information can be transmitted, for example, using mobile data networks (for example, 4G or 5G) to transmit pertinent data to an Internet-facing web services interface. The Internet-facing web services interface can be capable of receiving data in one or both of JavaScript Object Notation (JSON) or Extensible Markup Language (XML) format for information logging on centralized systems. RTB can be performed using onsite secure corporate WiFi networks to upload complete data sets directly to internal applications using direct transfer of data blobs, together with XML/JSON uploads.

Figure 3:
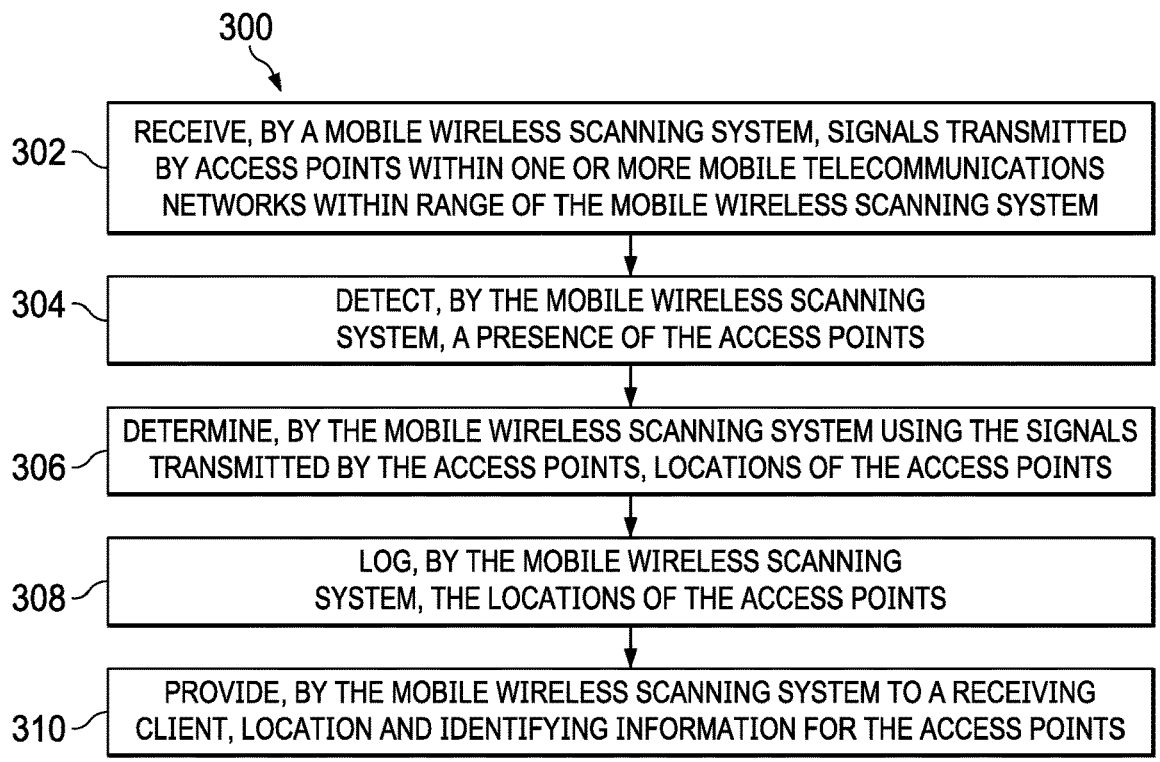
FIG. 3 is a flowchart of an example of a method for detecting access points, according to some implementations of the present disclosure.

FIG. 3 is a flowchart of an example of a method 300 for detecting access points, according to some implementations of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order.

At 302, signals transmitted by access points in one or more mobile telecommunications networks within range of a mobile wireless scanning system are received by the mobile wireless scanning system. The mobile wireless scanning system can be a vehicle-integrated enterprise wireless scanning system such as the mobile system 200, for example. The mobile wireless scanning system can be installed on a mobile vehicle, such as a car, a truck, or a drone, for example. From 302, method 300 proceeds to 304.

At 304, a presence of the access points is detected by the mobile wireless scanning system. For example, the presence that is detected can include detecting insecure WiFi devices and WiFi hotspots, detecting traffic on specific RF frequencies, and detecting rogue cell tower deployments. Detecting the traffic on the specific RF frequencies can include, for example, detecting and capturing: i) insecure RF transmissions on radio communication channels, ii) illicit transmissions, and iii) incorrectly-configured IoT devices leaking data on specific RF channels. Detecting rogue cell tower deployments can include, for example, detecting cell towers that are capable of performing localized attacks on the one or more mobile telecommunications networks. From 304, method 300 proceeds to 306.

At 306, locations of the access points are determined by the mobile wireless scanning system using the signals transmitted by the access points. For example, determining the locations of the access points can include the use of GPS technologies. In some implementations, determining the locations of the access points can include performing triangulation using two or more signals received at different locations over time from a same access point. From 306, method 300 proceeds to 308.

At 308, the locations of the access points are logged by the mobile wireless scanning system. As an example, logging the locations of the access points can include logging the type of each access point, such as i) insecure RF transmissions on radio communication channels, ii) illicit transmissions, and iii) incorrectly-configured IoT devices leaking data on specific RF channels. From 308, method 300 proceeds to 310.

At 310, location and identifying information for the access points are provided by the mobile wireless scanning system to a receiving client. For example, the mobile system 200 can provide information to a centralized system. In some implementations, providing the location and identifying information for the access points to the receiving client can include a real-time update. For example, pertinent data can be transmitted in a real-time update to an Internet-facing web services interface for logging on centralized systems. The Internet-facing web services interface can be capable of receiving the location and identifying information in one or more of JavaScript Object Notation (JSON) and Extensible Markup Language (XML) format. In some implementations, providing the location and identifying information for the access points to the receiving client can include providing a return-to-base update including uploading complete datasets through applications at the receiving client. Uploading can be performed, for example, using one or more of the ports on the circuit board 100. After 310, method 300 can stop.

Figure 4:
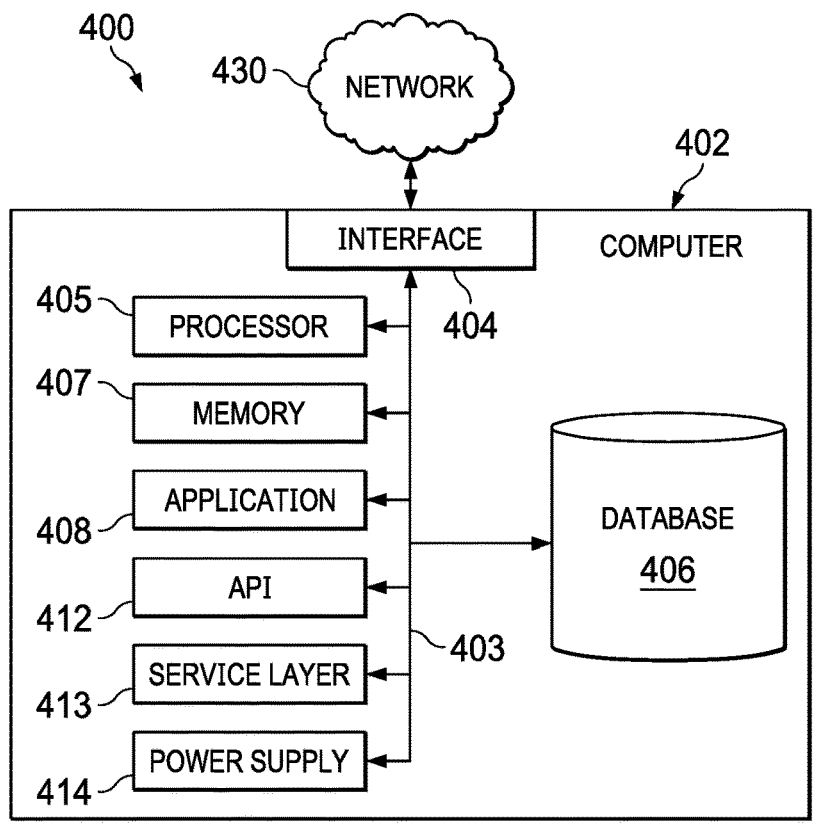
FIG. 4 is a block diagram illustrating an example computer system used to provide computational functionalities associated with described algorithms, methods, functions, processes, flows, and procedures as described in the present disclosure, according to some implementations of the present disclosure.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a top level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both) over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination.

For example, in a first implementation, a computer-implemented method includes the following. Signals transmitted by access points in one or more mobile telecommunications networks within range of a mobile wireless scanning system are received by the mobile wireless scanning system. A presence of the access points is detected by the mobile wireless scanning system. Locations of the access points are determined by the mobile wireless scanning system using the signals transmitted by the access points. The locations of the access points are logged by the mobile wireless scanning system. Location and identifying information for the access points are provided by the mobile wireless scanning system to a receiving client.

The foregoing and other described implementations can each, optionally, include one or more of the following features:

A first feature, combinable with any of the following features, where detecting the presence of the access points includes: detecting insecure wireless fidelity (WiFi) devices and WiFi hotspots; detecting traffic on specific radio frequency (RF) frequencies; and detecting rogue cell tower deployments.

A second feature, combinable with any of the previous or following features, where detecting traffic on specific RF frequencies includes detecting and capturing: i) insecure RF transmissions on radio communication channels, ii) illicit transmissions, and iii) incorrectly-configured Internet of Things (IoT) devices leaking data on specific RF channels.

A third feature, combinable with any of the previous or following features, where detecting rogue cell tower deployments includes detecting cell towers that are capable of performing localized attacks on the one or more mobile telecommunications networks.

A fourth feature, combinable with any of the previous or following features, where the mobile wireless scanning system is a vehicle-integrated enterprise wireless scanning system.

A fifth feature, combinable with any of the previous or following features, where the mobile wireless scanning system is installed on a mobile vehicle.

A sixth feature, combinable with any of the previous or following features, where logging the locations of the access points further includes logging the type of each access point.

A seventh feature, combinable with any of the previous or following features, where detecting the locations of the access points includes using global position system (GPS) technologies.

An eighth feature, combinable with any of the previous or following features, where detecting the locations of the access points includes performing triangulation using two or more signals received at different locations over time from a same access point.

A ninth feature, combinable with any of the previous or following features, where providing the location and identifying information for the access points to the receiving client includes transmitting pertinent data in a real-time update to an Internet-facing web services interface capable of receiving the location and identifying information in one or more of JavaScript Object Notation (JSON) and Extensible Markup Language (XML) format for logging on centralized systems.

A tenth feature, combinable with any of the previous or following features, where providing the location and identifying information for the access points to the receiving client includes providing a return-to-base update including uploading complete datasets through applications at the receiving client.

In a second implementation, a non-transitory, computer-readable medium stores one or more instructions executable by a computer system to perform operations including the following. Signals transmitted by access points in one or more mobile telecommunications networks within range of a mobile wireless scanning system are received by the mobile wireless scanning system. A presence of the access points is detected by the mobile wireless scanning system. Locations of the access points are determined by the mobile wireless scanning system using the signals transmitted by the access points. The locations of the access points are logged by the mobile wireless scanning system. Location and identifying information for the access points are provided by the mobile wireless scanning system to a receiving client.

The foregoing and other described implementations can each, optionally, include one or more of the following features:

A first feature, combinable with any of the following features, where detecting the presence of the access points includes: detecting insecure wireless fidelity (WiFi) devices and WiFi hotspots; detecting traffic on specific radio frequency (RF) frequencies; and detecting rogue cell tower deployments.

A second feature, combinable with any of the previous or following features, where detecting traffic on specific RF frequencies includes detecting and capturing: i) insecure RF transmissions on radio communication channels, ii) illicit transmissions, and iii) incorrectly-configured Internet of Things (IoT) devices leaking data on specific RF channels.

A third feature, combinable with any of the previous or following features, where detecting rogue cell tower deployments includes detecting cell towers that are capable of performing localized attacks on the one or more mobile telecommunications networks.

A fourth feature, combinable with any of the previous or following features, where the mobile wireless scanning system is a vehicle-integrated enterprise wireless scanning system.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Signals transmitted by access points in one or more mobile telecommunications networks within range of a mobile wireless scanning system are received by the mobile wireless scanning system. A presence of the access points is detected by the mobile wireless scanning system. Locations of the access points are determined by the mobile wireless scanning system using the signals transmitted by the access points. The locations of the access points are logged by the mobile wireless scanning system. Location and identifying information for the access points are provided by the mobile wireless scanning system to a receiving client.

The foregoing and other described implementations can each, optionally, include one or more of the following features:

A first feature, combinable with any of the following features, where detecting the presence of the access points includes: detecting insecure wireless fidelity (WiFi) devices and WiFi hotspots; detecting traffic on specific radio frequency (RF) frequencies; and detecting rogue cell tower deployments.

A second feature, combinable with any of the previous or following features, where detecting traffic on specific RF frequencies includes detecting and capturing: i) insecure RF transmissions on radio communication channels, ii) illicit transmissions, and iii) incorrectly-configured Internet of Things (IoT) devices leaking data on specific RF channels.

A third feature, combinable with any of the previous or following features, where detecting rogue cell tower deployments includes detecting cell towers that are capable of performing localized attacks on the one or more mobile telecommunications networks.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a GPS receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of UI elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   receiving, by a mobile wireless scanning system, signals transmitted by access points within one or more mobile telecommunications networks within range of the mobile wireless scanning system, wherein the signals are received using a multi-directional antenna configured to persistently and continuously gather radio frequency and network data, wherein the gathered radio frequency and the network data are used to identify locations of the access points during mobile operation of the mobile wireless scanning system, and wherein the mobile wireless scanning system is configured to operate in multiple configurations, including at least a wireless fidelity (WiFi) war driving mode and a rogue cell tower detection mode;
   detecting, by the mobile wireless scanning system using the signals received using the multi-directional antenna, a presence of the access points;
   determining, by the mobile wireless scanning system using the signals transmitted by the access points, locations of the access points, including using global position system (GPS) technologies to identify different GPS locations of the mobile wireless scanning system at which two or more signals are received over time from a same access point and performing triangulation using the different GPS locations to determine the locations of the access points;
   logging, by the mobile wireless scanning system, the locations of the access points; and
   providing, by the mobile wireless scanning system to a receiving client, a location and identifying information for the access points.

2. The computer-implemented method of claim 1, wherein detecting the presence of the access points comprises:
   detecting insecure wireless fidelity (WiFi) devices and WiFi hotspots;
   detecting traffic on specific radio frequency (RF) frequencies; and
   detecting rogue cell tower deployments.

3. The computer-implemented method of claim 2, wherein detecting traffic on specific RF frequencies includes detecting and capturing: i) insecure RF transmissions on radio communication channels, ii) illicit transmissions, and iii) incorrectly-configured Internet of Things (IoT) devices leaking data on specific RF channels.

4. The computer-implemented method of claim 2, wherein detecting rogue cell tower deployments includes detecting cell towers that are capable of performing localized attacks on the one or more mobile telecommunications networks.

5. The computer-implemented method of claim 1, wherein the mobile wireless scanning system is a vehicle-integrated enterprise wireless scanning system.

6. The computer-implemented method of claim 1, wherein the mobile wireless scanning system is installed on a mobile vehicle.

7. The computer-implemented method of claim 2, wherein logging the locations of the access points further includes logging the type of each access point.

8. The computer-implemented method of claim 1, wherein providing the location and the identifying information for the access points to the receiving client includes transmitting pertinent data in a real-time update to an Internet-facing web services interface capable of receiving the location and identifying information in one or more of JavaScript Object Notation (JSON) and Extensible Markup Language (XML) format for logging on centralized systems.

9. The computer-implemented method of claim 1, wherein providing the location and the identifying information for the access points to the receiving client includes providing a return-to-base update including uploading complete datasets through applications at the receiving client when a mobile vehicle carrying the mobile wireless scanning system returns to base.

10. A non-transitory, computer-readable medium storing one or more instructions executable by a computer system to perform operations comprising:
    receiving, by a mobile wireless scanning system, signals transmitted by access points within one or more mobile telecommunications networks within range of the mobile wireless scanning system, wherein the signals are received using a multi-directional antenna configured to persistently and continuously gather radio frequency and network data, wherein the gathered radio frequency and the network data are used to identify locations of the access points during mobile operation of the mobile wireless scanning system, and wherein the mobile wireless scanning system is configured to operate in multiple configurations, including at least a wireless fidelity (WiFi) war driving mode and a rogue cell tower detection mode;
    detecting, by the mobile wireless scanning system using the signals received using the multi-directional antenna, a presence of the access points;
    determining, by the mobile wireless scanning system using the signals transmitted by the access points, locations of the access points, including using global position system (GPS) technologies to identify different GPS locations of the mobile wireless scanning system at which two or more signals are received over time from a same access point and performing triangulation using the different GPS locations to determine the locations of the access points;
    logging, by the mobile wireless scanning system, the locations of the access points; and
    providing, by the mobile wireless scanning system to a receiving client, location and identifying information for the access points.

11. The non-transitory, computer-readable medium of claim 10, wherein detecting the presence of the access points comprises:

detecting insecure wireless fidelity (WiFi) devices and WiFi hotspots;
detecting traffic on specific radio frequency (RF) frequencies; and
detecting rogue cell tower deployments.

12. The non-transitory, computer-readable medium of claim 11, wherein detecting traffic on specific RF frequencies includes detecting and capturing: i) insecure RF transmissions on radio communication channels, ii) illicit transmissions, and iii) incorrectly-configured Internet of Things (IoT) devices leaking data on specific RF channels.

13. The non-transitory, computer-readable medium of claim 11, wherein detecting rogue cell tower deployments includes detecting cell towers that are capable of performing localized attacks on the one or more mobile telecommunications networks.

14. The non-transitory, computer-readable medium of claim 10, wherein the mobile wireless scanning system is a vehicle-integrated enterprise wireless scanning system.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
receiving, by a mobile wireless scanning system, signals transmitted by access points within one or more mobile telecommunications networks within range of the mobile wireless scanning system, wherein the signals are received using a multi-directional antenna configured to persistently and continuously gather radio frequency and network data, wherein the gathered radio frequency and the network data are used to identify locations of the access points during mobile operation of the mobile wireless scanning system, and wherein the mobile wireless scanning system is configured to operate in multiple configurations, including at least a wireless fidelity (WiFi) war driving mode and a rogue cell tower detection mode;
detecting, by the mobile wireless scanning system using the signals received using the multi-directional antenna, a presence of the access points;
determining, by the mobile wireless scanning system using the signals transmitted by the access points, locations of the access points, including using global position system (GPS) technologies to identify different GPS locations of the mobile wireless scanning system at which two or more signals are received over time from a same access point and performing triangulation using the different GPS locations to determine the locations of the access points;
logging, by the mobile wireless scanning system, the locations of the access points; and
providing, by the mobile wireless scanning system to a receiving client, location and identifying information for the access points.

16. The computer-implemented system of claim 15, wherein detecting the presence of the access points comprises:
detecting insecure wireless fidelity (WiFi) devices and WiFi hotspots;
detecting traffic on specific radio frequency (RF) frequencies; and
detecting rogue cell tower deployments.

17. The computer-implemented system of claim 16, wherein detecting traffic on specific RF frequencies includes detecting and capturing: i) insecure RF transmissions on radio communication channels, ii) illicit transmissions, and iii) incorrectly-configured Internet of Things (IoT) devices leaking data on specific RF channels.

18. The computer-implemented system of claim 16, wherein detecting rogue cell tower deployments includes detecting cell towers that are capable of performing localized attacks on the one or more mobile telecommunications networks.

* * * * *